(12) United States Patent
Cardenas (10) Patent No.: US 11,981,174 B1
(45) Date of Patent: May 14, 2024

(54) ELECTRICAL CONNECTION FOR TRAILER HITCH WITH ENHANCED STRENGTH BALL ASSEMBLY

(71) Applicant: Daniel Cardenas, Marietta, GA (US)

(72) Inventor: Daniel Cardenas, Marietta, GA (US)

( * ) Notice: Subject to any disclaimer, the term of this patent is extended or adjusted under 35 U.S.C. 154(b) by 0 days.

(21) Appl. No.: 18/367,648

(22) Filed: Sep. 13, 2023

(51) Int. Cl.
*B60D 1/62* (2006.01)
*B60D 1/06* (2006.01)
*B60D 1/64* (2006.01)

(52) U.S. Cl.
CPC .............. *B60D 1/62* (2013.01); *B60D 1/06* (2013.01); *B60D 1/64* (2013.01)

(58) Field of Classification Search
CPC .............. B60D 1/62; B60D 1/06; B60D 1/64
See application file for complete search history.

(56) References Cited

U.S. PATENT DOCUMENTS

| | | | | |
|---|---|---|---|---|
| 3,116,940 A | * | 1/1964 | Jinesa ...................... | B60D 1/62 439/8 |
| 3,328,741 A | * | 6/1967 | Brown ..................... | B60D 1/62 439/708 |
| 6,481,738 B1 | * | 11/2002 | Duncan .................. | B60Q 1/305 439/8 |
| 7,581,746 B2 | * | 9/2009 | Abate .................. | B62D 53/125 403/321 |
| 8,308,181 B2 | * | 11/2012 | Riibe ....................... | B60D 1/64 280/422 |
| 8,382,323 B2 | * | 2/2013 | Robb ..................... | H01R 35/04 362/249.02 |
| 10,106,003 B2 | * | 10/2018 | Cardenas ................ | B60D 1/06 |
| 2023/0069630 A1 | * | 3/2023 | Peacemaker ............ | B60D 1/06 |

* cited by examiner

*Primary Examiner* — Tony H Winner
*Assistant Examiner* — Marlon A Arce
(74) *Attorney, Agent, or Firm* — H. Jay Spiegel (57) ABSTRACT

A ball assembly for a trailer hitch has a ball and an extended length neck connected to a threaded shaft. The ball assembly is made of a steel material such as 4140 or 4142 carbon steel which has a tensile strength of at least 95,000 psi to better withstand lateral and torsional forces.

20 Claims, 8 Drawing Sheets

ELECTRICAL CONNECTION FOR TRAILER HITCH WITH ENHANCED STRENGTH BALL ASSEMBLY

BACKGROUND OF THE INVENTION

This application is a Continuation-in-Part of application Ser. No. 17/992,070, filed Nov. 22, 2022. The present invention relates to an electrical connection for trailer hitch with enhanced strength ball assembly. Applicant is the inventor of the trailer hitch disclosed and claimed in U.S. Pat. No. 10,106,003 issued on Oct. 23, 2018. The patented trailer hitch provides a great advance in the field of hitching trailers to vehicles. Its main feature is electrical connections incorporated into a sleeve surrounding the hitch ball and the female coupling attached to the trailer or other towed vehicle.

Figure 1:
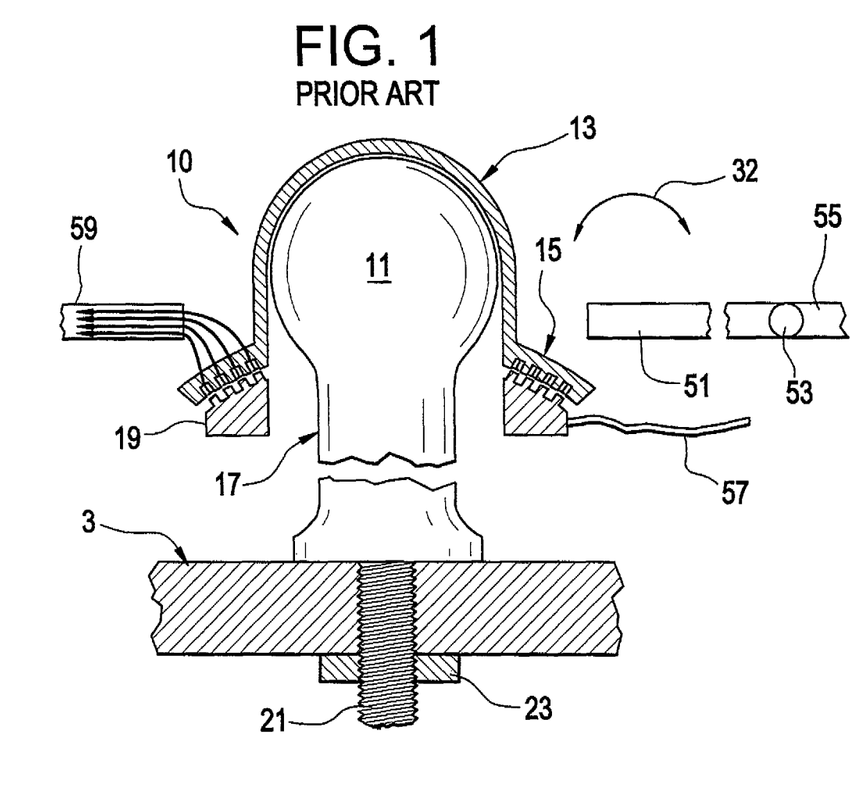
FIG. 1 shows a side view partially in cross-section of the invention disclosed in U.S. Pat. No. 10,106,003 and corresponds to FIG. 1 in that patent.
Figure 2:
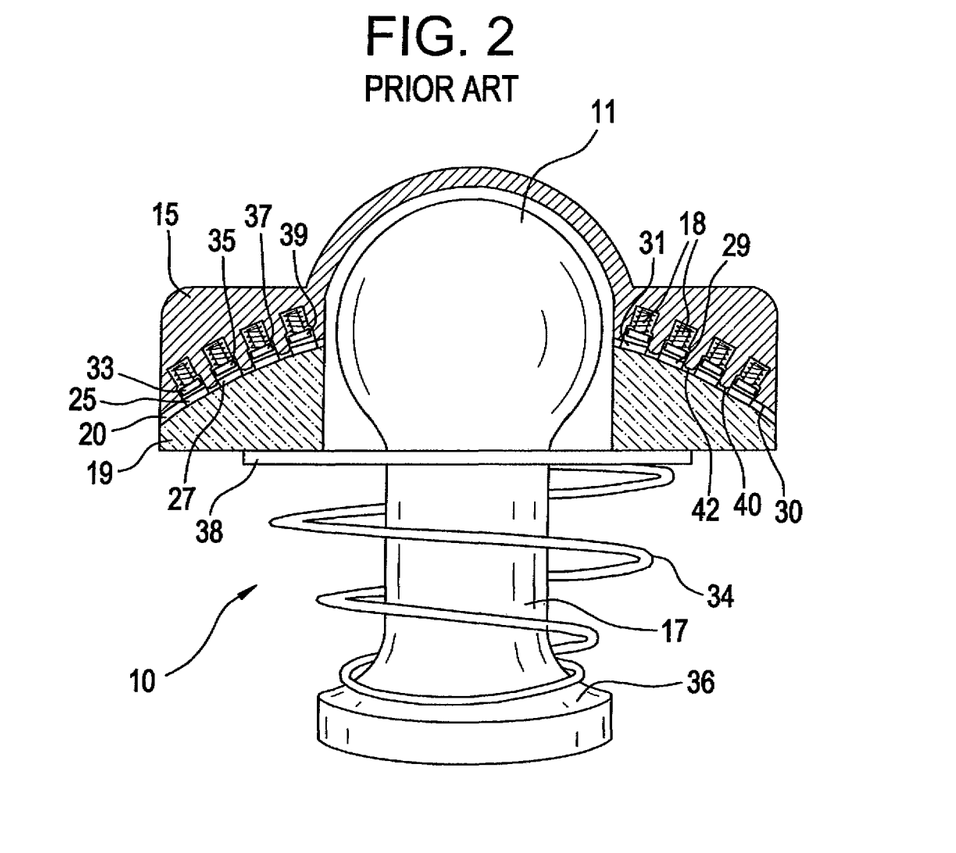
FIG. 2 shows a side view partially in cross-section including other aspects of the invention disclosed in U.S. Pat. No. 10,106,003 and corresponds to FIG. 5 in that issued patent.

FIG. 1 herein is the same as FIG. 1 from Applicant's prior patent and shows the hitch invention generally designated by the reference numeral 10, the ball 11, and the socket 13. The ball 11 is connected to an elongated neck 17 which must be elongated to accommodate to the height of the collar 19. The socket 13 depends downwardly and merges with a peripheral shoulder 15 that has at its underside a plurality of contact pins 33 which are shown in FIG. 2 herein which corresponds to FIG. 5 in the issued patent. The contacts 33 are biased downwardly by coil springs 18 (FIG. 2) which cause the contacts to be biased downwardly into contact with arcuate contacts 25, 27, 29 and 31 so that the pins 33 contact a respective contact in any rotative position of the socket 13 with respect to the collar 19 that carries the contacts 25, 27, 29 and 31.

As shown in FIG. 2, a coil spring 34 biases a plate 38 upwardly which causes the collar 19 to be biased upwardly to maintain contact between the pins 33 and the contacts on the collar 19. As shown in FIG. 1, an electrical conductor 57 includes from four to eight wires therein on the towing vehicle which connect to various ones of the arcuate contacts 25, 27, 29 and 31. An additional electrical conductor 59 connects to various features of the towed vehicle as understood by those skilled in the art.

What Applicant's prior patent fails to disclose is a manner by which the electrical conductor 57 may be interconnected into the existing wiring of the towed vehicle to make the electrical connection between the towing vehicle, the hitch 10, and the lights, brakes, reversing solenoid, and other features of the trailer or other towed vehicle. The present invention intends to further advance the details disclosed in Applicant's prior invention.

Figure 12:
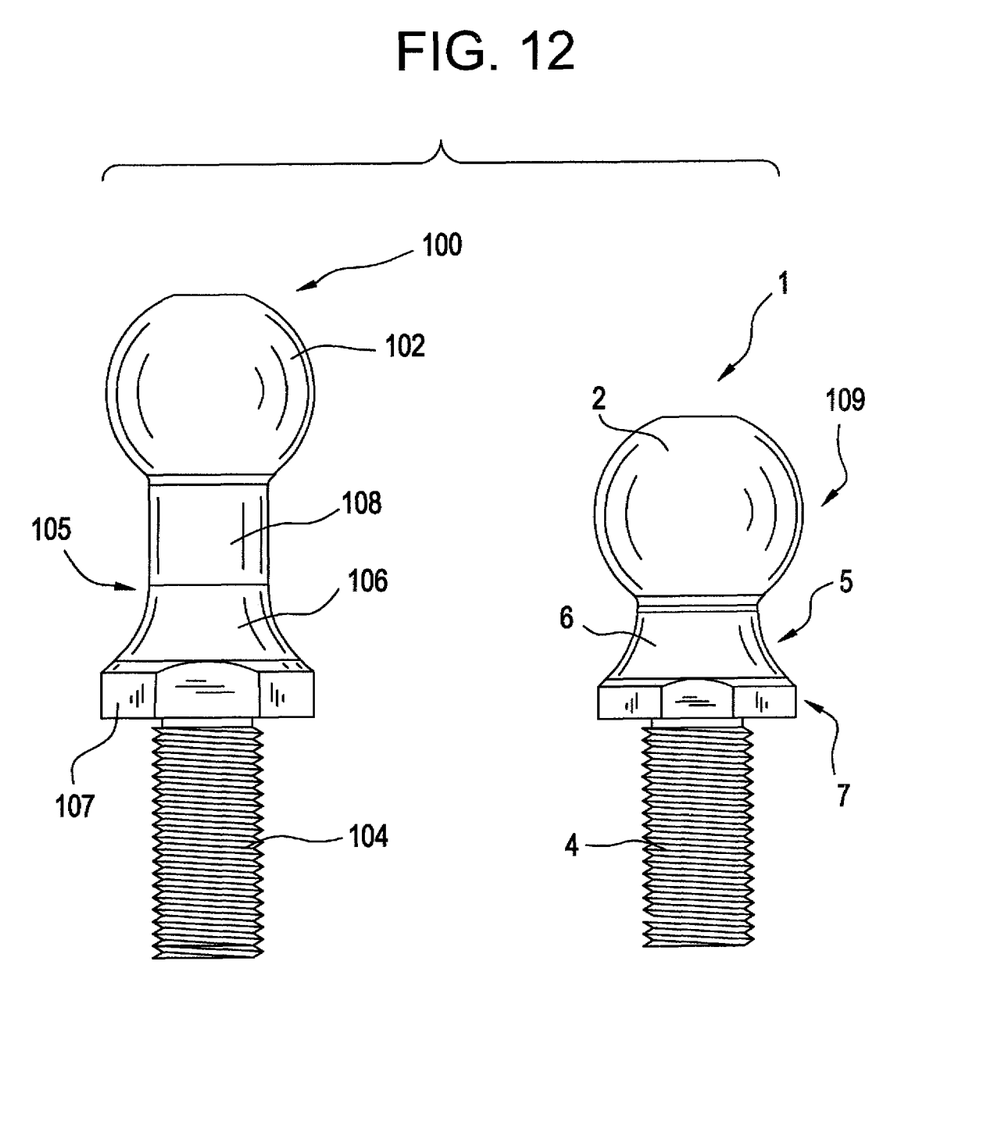
FIG. 12 shows side views of a prior art ball assembly and the ball assembly in accordance with the teachings of the present invention.

FIG. 12 shows a comparison of a conventional prior art ball assembly 1 and the inventive ball assembly 100. The ball assembly 1 includes a ball 2, a threaded shaft 4, and between the ball 2 and the threaded shaft 4, a neck area 5 including a tapered section 6, and a hexagonal section 7 designed to receive a wrench to facilitate installing the ball assembly 1. There is no significant cylindrical portion of the neck area 5.

As also shown in FIG. 12, the inventive ball assembly 100 includes a ball 102, a threaded shaft 104, a neck area 105, and a portion 107 that is six-sided and designed to receive a wrench for installation. Notably, the neck area 105 has an elongated preferably cylindrical area 108 between the ball 102 and the flared portion 106 of the neck area 105.

As should be understood by those of ordinary skill in the art, when a vehicle is towing another vehicle such as, for example, a trailer, when the socket 13 (FIG. 1) is installed over the ball and towing is occurring, forces are generated in the direction of the arrow 109 in FIG. 12 which the tensile strength of the material used to manufacture the ball assembly must resist to avoid breakage and failure of the coupling. Typically, the material from which the prior art ball assembly 1 is constructed is known as 1038 carbon steel. Such steel material is known to have a tensile strength of about 83 KSI (83,000 psi). Applicant has discovered that the tensile strength exhibited by 1038 carbon steel may be insufficient to preclude failure of the ball assembly 1 in use. This is particularly true where the ball assembly such as the ball assembly 100 has an elongated neck 108. The elongated neck assembly 105 with the cylindrical neck portion 108 accentuates the need to find a material to be used in manufacturing the ball assembly 100 which can withstand the lateral and torsional forces impressed upon it during towing. It is with this problem in mind that the present invention was developed.

SUMMARY OF THE INVENTION

The present invention relates to an electrical connection for trailer hitch with enhanced strength ball assembly. The present invention includes the following interrelated objects, aspects and features:

(1) In a first aspect of the present invention, the hitching ball is attached to a hitch bar which includes, in most embodiments, a rectangular or square cross-section proximal end which is received within a corresponding rectangular or square cross-section receptacle located below the rear bumper of the towing vehicle. The receptacle is mounted on a draw bar of the towing vehicle.

(2) In the preferred embodiment, a passageway is formed through the hitch bar that allows the electrical conductor containing four to eight wires to be threaded through the hitch bar to its proximal end. At the proximal end the wires are attached to the first half of an electrical conductor.

(3) Within the rectangular cross-section receptacle, a second half of the connector is located which has complementary connections to interconnect with the connections on the first half of an electrical conductor located at the proximal end of the hitch bar. The mutually interconnectable connections can be pins and receptacles or recesses and the pins can be at the proximal end of the hitch bar or on the proximal side of the second connector half in the receptacle or vice-versa.

(4) The connector half within the rectangular cross-section receptacle may be spring biased in the distal direction in the preferred embodiment. The reason why this is the case is that many hitch bars have plural lateral holes to allow attachment within the receptacle at plural degrees of extension with respect to the rectangular cross-section receptacle. With the spring allowing the second half which can be a plate to reciprocate within the rectangular cross-section receptacle, the electrical connection can be made regardless of which lateral hole is chosen through which a pin can be extended to couple the hitch bar to the receptacle.

(5) As explained above, the half of the electrical connector within the rectangular cross-section receptacle is mounted on a plate which receives the distal end of the coil spring which also engages a proximal wall of the rectangular cross-section receptacle so that the spring can bias the plate in the distal direction.

(6) Electrical conductors are connected to the connector halves mounted on the plate and those wires extend proximally through the wall on which the coil spring is engaged and are coupled to electrical contacts on the proximal side of the draw bar which connect to the electrical coupling that is already in existence on the vehicle. In this way, the wires within the electrical conductor which is threaded through the hitch bar and coupled to a connector half at the proximal end of the hitch bar, are coupled electrically to the connector half attached to a plate and are now connected to all of the electrical connections already existing in the vehicle which allow the towed vehicle to respond to activations of brakes, turn signals, hazard warnings, headlights, and also engaging the transmission in reverse to activate a solenoid to release trailer brakes to allow a trailer to be moved in reverse.

(7) An important aspect of the present invention is recognition that the ball assembly of the present invention has an elongated neck to accommodate for the fact that the collar must be placed around the neck and spring biased upward toward the socket 13 to make the required electrical connections. The elongation of the neck of the ball assembly creates the danger that lateral and torsional forces perpendicular to the axis of elongation of the ball assembly are more likely to cause failure of the ball assembly by cracking or breaking at the neck area than is the case with the prior art ball assembly 1 shown in FIG. 12. As such, an important aspect of the present invention as disclosed herein is making the ball assembly of a material which has enhanced tensile strength to resist any failure caused by forces lateral and torsional with respect to the axis of elongation of the ball assembly. Applicant has found that utilizing 4140 or 4142 carbon steel results in dramatic enhancement of the tensile strength of the ball assembly as opposed to the strength exhibited by prior art ball assemblies which are typically made of 1038 carbon steel.

(8) In this way, the invention disclosed in Applicant's prior U.S. patent can effectively be installed on towed and towing vehicles. All that need be done is to insert the rectangular cross-section proximal end of the hitch bar into the rectangular cross-section receptacle already on the vehicle and once that proximal end of the hitch bar is pushed therein, the connector halves engage one another and make the electrical connection between Applicant's patented trailer hitch, the towing vehicle, and the towed vehicle in an extremely efficient and easy manner. The present invention augments the advantageous features of Applicant's patented trailer hitch by providing an efficient manner of using that trailer hitch to couple the electrical connections between the towing vehicle and the towed vehicle so that a system is provided allowing all of that to be accomplished. The present invention also enhances the strength of the ball assembly to resist failure from lateral forces generated during towing.

As such, it is a first object of the present invention to provide an electrical connection for trailer hitch.

It is a further object of the present invention to provide such a device in which the electrical conductor carrying multiple wires may be threaded through a passageway provided in the hitch bar and connect the electrical conductor to one half of an electrical coupling.

It is a further object of the present invention to provide such an invention in which the second half of the electrical connector is located within the rectangular cross-section receptacle on the vehicle to allow electrical connection to be made therebetween.

It is a still further object of the present invention to provide such an invention in which an electrical conductor connected to the second half of the electrical coupling is connected to wiring already present within the vehicle and located where the existing electrical connection is provided.

It is a still further object of the present invention to provide such an invention in which a hitch bar may merely be inserted into the rectangular cross-section receptacle to make the electrical connection and the inventive trailer hitch may be utilized to efficiently couple a towing vehicle to a towed vehicle.

It is a yet further object of the present invention to provide such an invention in which the ball assembly is manufactured from an enhanced strength steel material to enhance tensile strength and facilitate resistance to failure from torsional and lateral forces.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figures 3, 4:
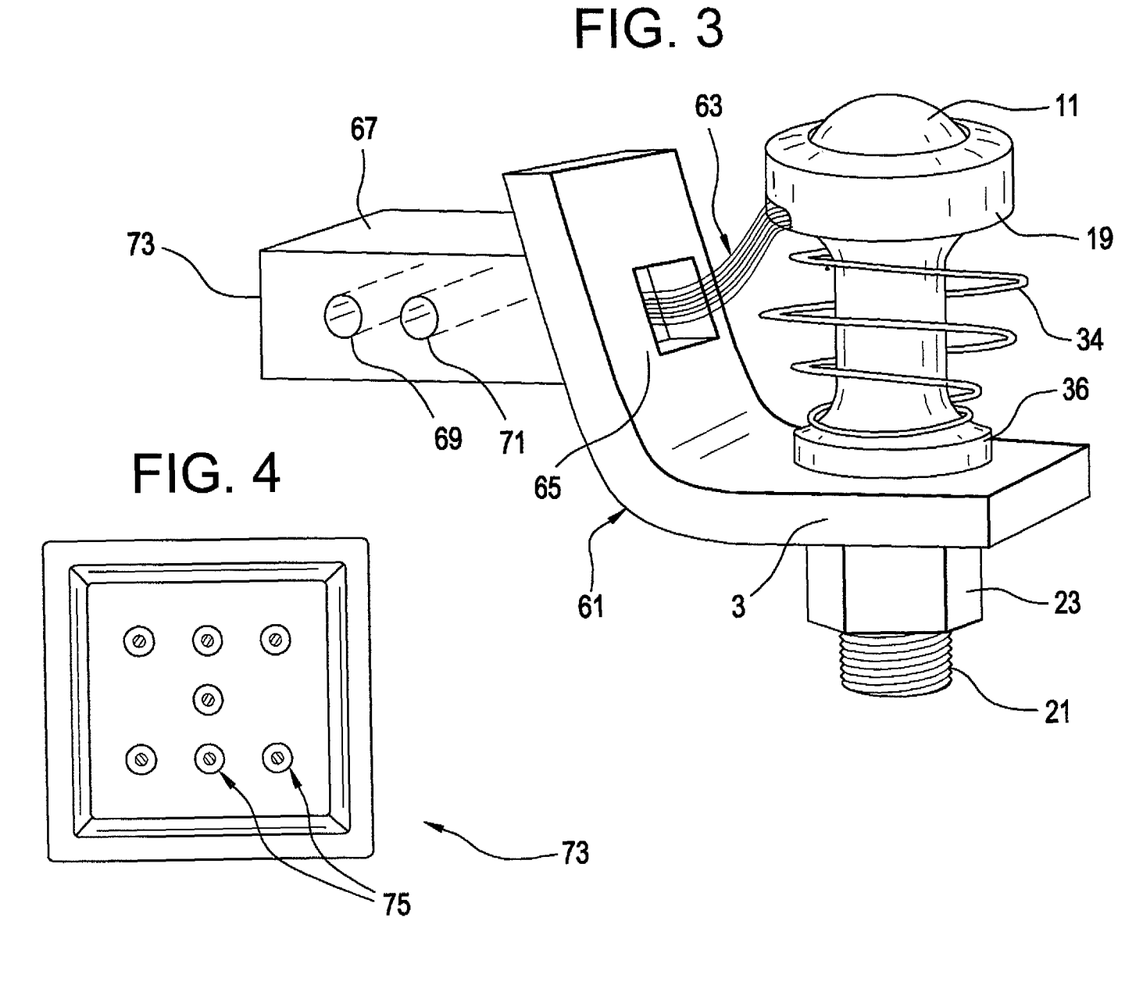
FIG. 3 shows a perspective view of a hitch bar showing certain details of the present invention.
FIG. 4 shows a view looking distally from the proximal end of the hitch bar.

With reference first to FIG. 3, reference numerals corresponding to those set forth in Applicant's prior patent are the same as shown in FIGS. 1 and 2 herein. As seen in FIG. 3, the hitch bar 3 has an arcuate portion 61 which includes an opening (not shown) which receives the threaded stem 21 which is fastened to the hitch bar by a threaded fastener 23. The spring 34 biases the collar 19 upwardly. An electrical conductor 63 is attached to the collar 19 which has mounted thereon a plurality of arcuate contacts as shown in FIG. 3 of Applicant's issued patent. The electrical conductor 63 includes from four to eight wires. Those wires couple the towed vehicle such as a trailer to various electrical features on the towing vehicle. Those features can include the headlights, brake lights, running lights, signals, hazard flashers, turn signal controls, and the transmission so that when the towing vehicle is shifted into reverse, a solenoid in the towed vehicle such as a trailer can release the trailer brakes to allow the trailer to be backed up in the reverse direction.

As seen in FIG. 3, the arcuate portion 61 has a hole 65 therethrough through which the electrical conductor 63 extends as will be described in greater detail hereinafter. Also seen in FIG. 3 is a rectangular cross-section proximal end or coupling half 67 of the hitch bar 3 which includes a plurality of lateral holes 69 and 71 each of which allows insertion of a pin 70 (FIG. 5) to couple the portion 67 to a rectangular cross-section receptacle as will be described in greater detail hereinafter. The passageway 79 (FIG. 7) through the proximal portion 67 does not intersect the lateral holes 69 and 71 and carries the electrical conductor 63 to the proximal end 73 of the hitch bar 3.

FIG. 4 shows the proximal end 73 of the portion 67 of the hitch bar 3. As shown, a plurality of contacts 75 are displayed. These contacts comprise one half of an electrical connector also described as a first electrical connector half and may comprise recesses or pins as will be described hereinafter with regard to FIGS. 8-10. These contacts 75 correspond in number to the number of wires contained within the electrical conductor 63.

Figure 5:
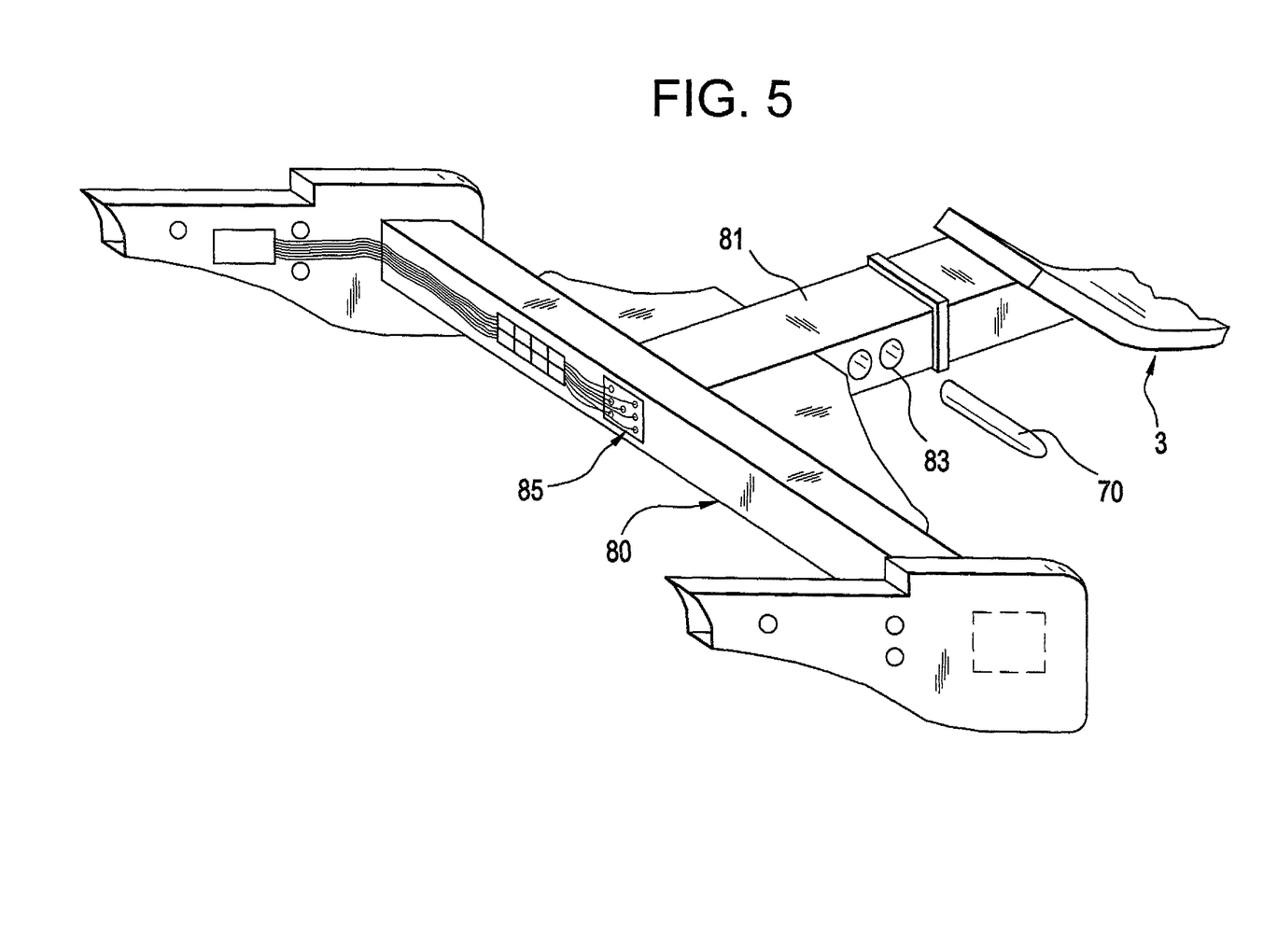
FIG. 5 shows a perspective view of the rear portion of the towing vehicle.

With reference now to FIG. 5, a tow bar 80 is seen to have connected thereto a rectangular cross-section receptacle 81. That receptacle includes a lateral hole 83 that can be aligned with either of the lateral holes 69 or 71 so that the pin 70 can be inserted through the hole 83, the hole 69 or 71, and a hole on the other side of the receptacle 81 (not shown) to couple the hitch bar 3 to the receptacle 81. As shown in FIG. 5, a connector 85 is provided on the proximal end of the tow bar and connects with an electrical connector on the distal side of the tow bar 80 which is found on the tow vehicle and which is typically (in the prior art) used to couple electrical connections from the towed vehicle. The connector 85 connects to all of the electrical features described above that will need to be transferred to the towed vehicle.

Figure 6:
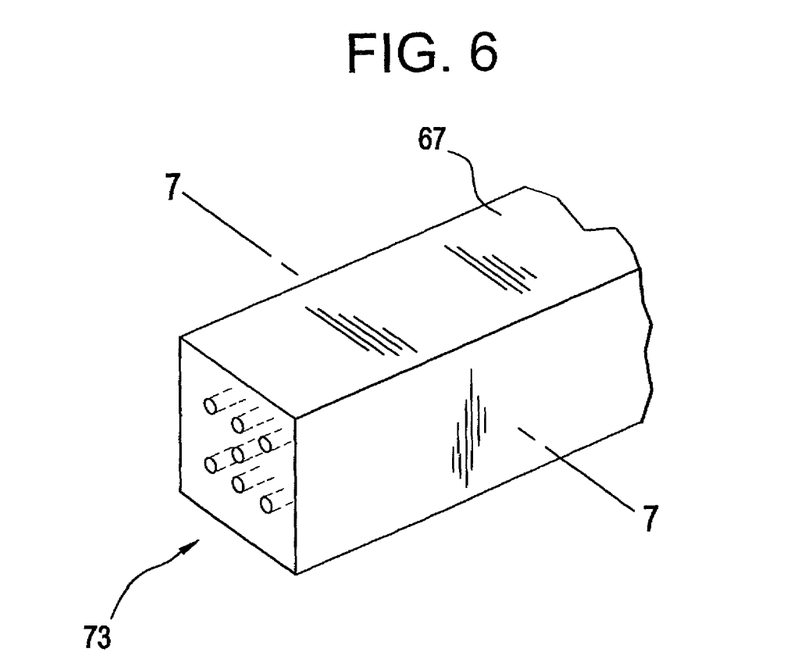
FIG. 6 shows a perspective view showing the distal end of the hitch bar.
Figure 7:
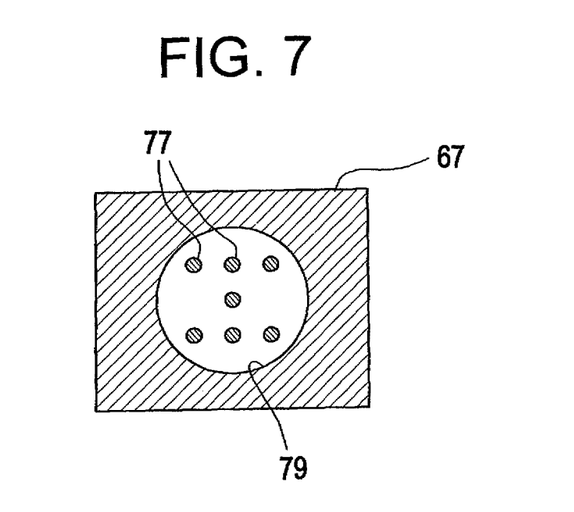
FIG. 7 shows a cross-sectional view along the line 7-7 of FIG. 6.

With reference to FIGS. 6 and 7, the connector 73 is shown on the proximal end of the portion 67 of the hitch bar 3. FIG. 7 shows the wires 77 extending through the passageway 79 through the portion 67.

Figure 8:
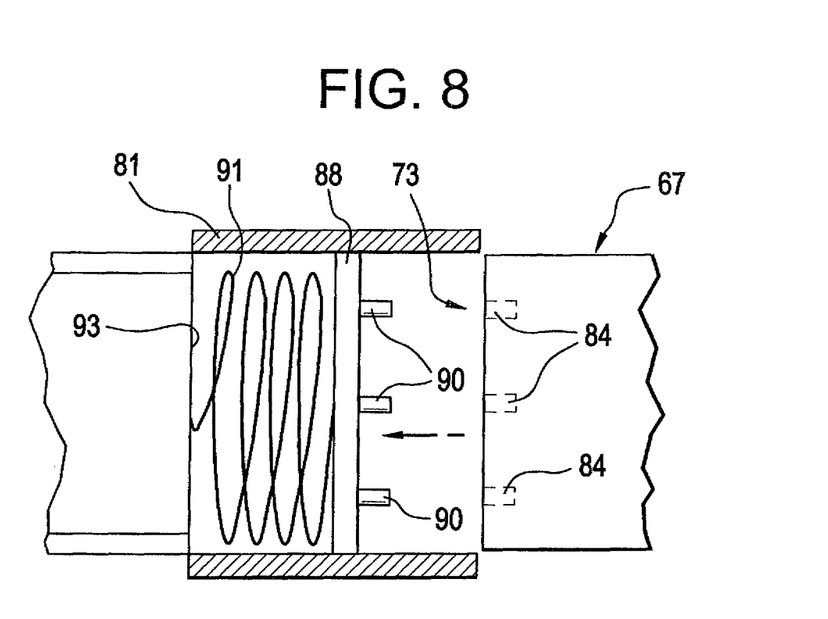
FIG. 8 shows a side view of the electrical connector between the hitch bar and a plate within the rectangular cross-section receptacle.
Figure 9:
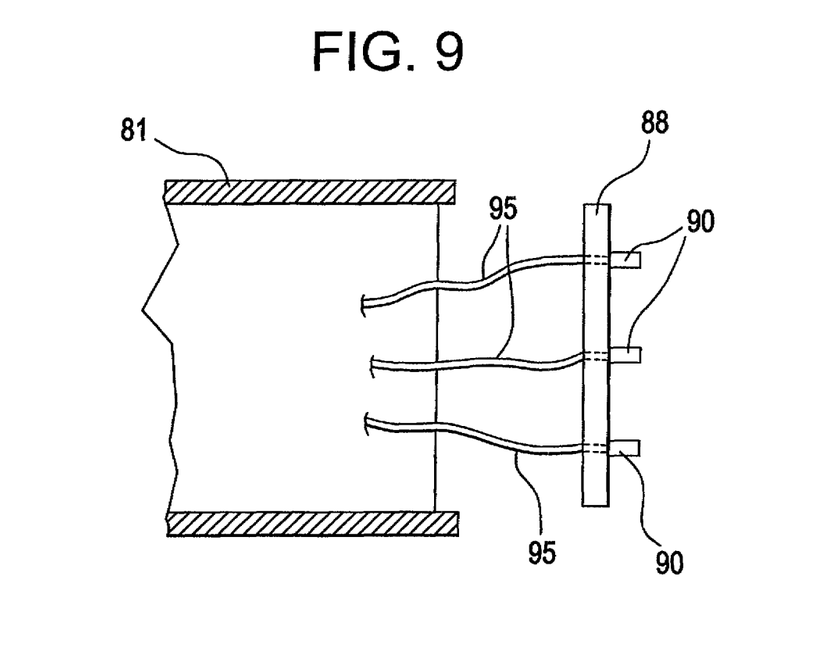
FIG. 9 shows a view similar to that of FIG. 9 with certain features removed to show detail.

With reference to FIGS. 8 and 9, the proximal portion 67 is shown with the coupling 73 provided with electrical contact recesses 84. A plate 88 within the rectangular cross-section receptacle 81 defines a second electrical connector half having pins 90 which are inserted within the recesses 84 to make the electrical connection. A coil spring 91 engages the proximal end of the plate 88 and a wall 93 to bias the plate 88 in the direction of the portion 67 of the hitch bar 3. The floating nature of the plate 88 permits the electrical connection between the recesses 84 and the pins 90 to be made regardless of which lateral passageway 69 or 71 in the proximal portion 67 is used to couple the hitch bar 3 to the receptacle 81.

FIG. 9 shows the plate 88 with its pins 90 and electrical conductors 95 connected to each pin 90.

Figure 10:
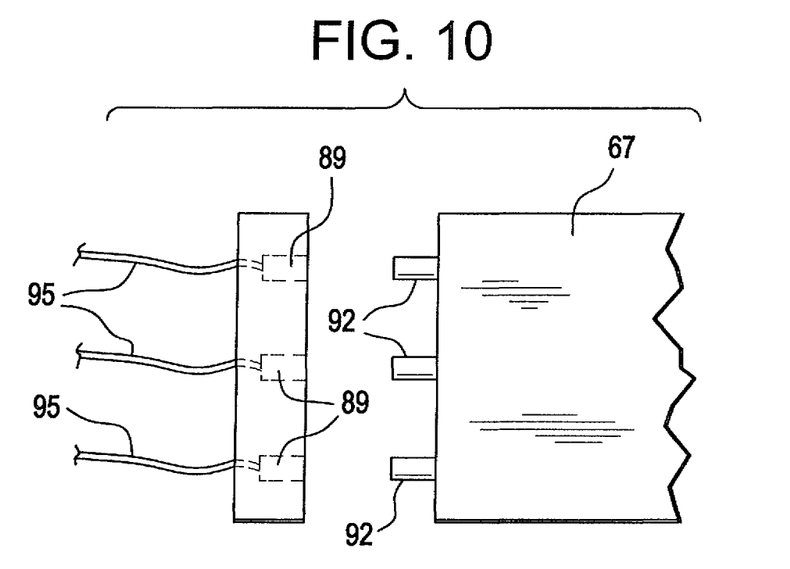
FIG. 10 shows a view similar to that of FIG. 10 with connector half pins and recesses being reversed.

With reference to FIG. 10, an alternative embodiment is shown in which the recesses 84 are replaced with pins 92 and the pins 90 are replaced with recesses 89 which is the reverse of the situation shown in FIGS. 8 and 9. However, the functions are the same.

Figure 11:
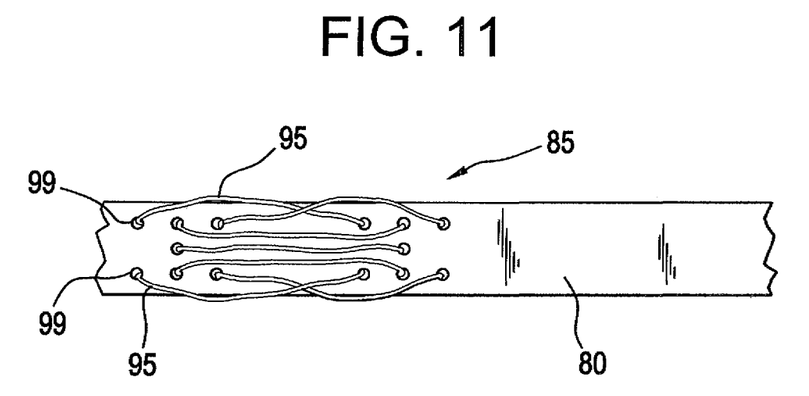
FIG. 11 shows a view looking distally from the proximal surface of the tow bar of the towing vehicle showing connection of electrical conductors between the hitch bar and the existing connectors on the tow bar.

FIG. 11 shows the tow bar 80 and the connections at 85 which connect to an existing electrical socket on the towing vehicle. It also shows holes 99 through which the wires 95 extend and couple to the connector 85 to couple the electrical conductor 63 to the existing electrical wiring of the towing vehicle. The connector 85 which connects with the coupling at the rear of the tow bar 80 which is found on most towing vehicles connects all of the electrical systems of the vehicle which are going to be utilized by the towed vehicle to the electrical circuitry of the towing vehicle so that when the portion 67 of the hitch bar 3 is inserted into the receptacle 81 and the connector halves shown in particular in FIG. 8 or FIG. 10 with the interconnecting pins and recesses connect the electrical circuitry together.

The electrical connections between the towing vehicle and the towed vehicle such as a trailer may include electrical conductors conveying data received from sensors on the towed vehicle. For example, sensors can monitor (1) operation of various lights on the towed vehicle and report malfunctions, (2) whether safety chains are loose, (3) whether emergency brake wire is disconnected, (4) tire pressures, (5) stuck brakes, (6) operation of solenoid brake release, and others. This ability enhances safety.

In this way, the present invention provides a simple way to couple a towing vehicle to a towed vehicle with all the electrical connections being made with the hitch bar 3 proximal portion 67 received within the receptacle 81. Once the hitch bar 3 is connected to the receptacle 81, as soon as the socket 13 on the towed vehicle is coupled over the ball 11, all electrical connections are now made with no need to separately connect an electrical conductor to a receptacle on the vehicle. In this way, there is no wire dangling between the towing vehicle and the towed vehicle which can get damaged or torn or be dislodged. The connections are secure and effective.

Thus, with the present invention in place, Applicant's invention that is the subject of his prior patent may now be incorporated into a trailer hitching system of great efficiency and effectiveness.

As explained in the BACKGROUND OF THE INVENTION, prior art ball assemblies did not have elongated necks. This is shown with reference to reference numeral 1, the ball assembly of the prior art. Typically, such ball assemblies were made of a material such as 1038 carbon steel which is known to have a tensile strength of 83 KSI (83,000 psi). While this level of strength has been found, historically, to be sufficient for ball assemblies such as the ball assembly 1, introduction of the elongated cylindrical portion 108 to the neck has introduced the danger that lateral and torsional forces could snap the neck assembly 105 or otherwise cause failure of a trailer hitch incorporating a ball assembly 100 with its elongated neck. As such, Applicant conducted extensive experimentation to try to find a material from which a ball assembly with an elongated neck could be manufactured so that it would better resist failure through torsional and lateral forces.

Through research and experimentation, Applicant has found that replacing 1038 carbon steel with 4140 or 4142 carbon steel enhances the ability of a ball assembly to resist lateral and torsional forces.

1038 carbon steel such as is used in prior art ball assemblies has a known tensile strength of about 83 KSI. By contrast, 4140 carbon steel has a tensile strength of around 95 KSI, and 4142 carbon steel has a tensile strength of about 100 KSI. Other data indicates that the tensile strength of 4142 carbon steel might be as high as 140 KSI, almost double the tensile strength of 1038 carbon steel. In any event, Applicant has found that using a steel material with a tensile strength of at least 95 KSI is sufficient to overcome potential failure issues attributable to elongation of the neck portion of a ball assembly, particularly with reference to reference numeral 108 in FIG. 12.

In a further aspect, the 4140 or 4142 carbon steel may be further strengthened by submitting it to a heat treating process. Typically, the raw material is forged into a shaped close to the finished shape, then machined into the finished shape, then the unthreaded shaft portion is threaded to create the ball assembly. Next, the ball assembly is placed into an oven heated to about 1,600 degrees F. where it remains for about 2 hours. Then it is subjected to an oil quenching stage for at least 30 minutes. As a result, the ball assembly is strengthened to about 120,000 pounds of torsion resistance. While typical ball assemblies 1 have a towing capacity of up to 6,000 pounds, the combination of employing 4140 or 4142 carbon steel and heat treating it raises the rating of the ball assembly 100 to 12,000 pounds with a tongue weight up to 2,000 pounds. This exceeds Class 4 towing capacity.

In the preferred embodiment, the neck portion 108 is about one inch tall. It can, if desired, be made taller, up to 1.5 inches. In the preferred embodiment, the diameter of the cylindrical neck portion 108 is approximately 1.125 inches but can be as great as 1.25 inches. A neck portion 108 with a diameter of 1.25 inches has a cross-sectional area 23.4% larger than the cross-sectional area of a neck portion 108 with a diameter of 1.125 inches. A neck portion 108 with a diameter of 1.25 inches has a cross-sectional area 56.25% greater than a neck portion 108 with a diameter of 1 inch. The greater cross-sectional area translates to greater strength.

Additionally, the strength of the ball assembly has been significantly enhanced to resist lateral and torsional forces that could otherwise cause failure at the neck portion of the ball assembly.

As such, an invention has been disclosed in terms of a preferred embodiment thereof which fulfills each and every one of the objects of the invention as set forth hereinabove, and provides a new and useful electrical connection for trailer hitch of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. In a trailer hitching system comprising a hitch bar carrying a hitching ball connected to an extended length neck, a collar below said hitching ball surrounding said neck and reciprocable on said neck, said collar having a plurality of electrical conductors, a plurality of electrical contacts on said collar, each electrical contact having one of said electrical conductors connected thereto, said hitch bar including a proximal coupling half receivable within a recess in a coupling receptacle on a towing vehicle to couple said hitch bar to said towing vehicle, a socket on a towed vehicle sized to couple with said hitching ball and including electrical circuitry connectable to said electrical contacts on said collar to electrically connect electrical systems on said towed vehicle to said electrical contacts on said collar, the improvement comprising a passageway extending through said proximal coupling half, said electrical conductors for said electrical contacts on said collar extending through said passageway to a proximal end of said proximal coupling half, a first electrical connector half located on said proximal end of said proximal coupling half, each of said electrical conductors being connected to an electrical contact on said first electrical connector half, and a second electrical connector half located in said coupling receptacle, said second electrical connector half having electrical contacts thereon complementary to said contacts on said first electrical connector half and aligned therewith, whereby said electrical connector halves engage one another to electrically connect said electrical contacts on said collar with said electrical contacts on said second electrical connector half, said electrical contacts on said second electrical connector half being electrically connected to electrical circuitry on said towing vehicle, the improvement further comprising said hitching ball and extended length neck comprising a ball assembly also including a threaded shaft, said ball assembly made of a material exhibiting a tensile strength of at least 95,000 psi.

2. The improvement of claim 1, wherein said material comprises 4140 carbon steel.

3. The improvement of claim 1, wherein said material comprises 4142 carbon steel.

4. The improvement of claim 1, wherein said material has a tensile strength of 95,000 psi to 140,000 psi.

5. The improvement of claim 1, wherein said extended length neck has a length of 1".

6. The improvement of claim 5, wherein said extended length neck has a diameter of 1.125".

7. The improvement of claim 5, wherein said extended length neck has a diameter of 1.25".

8. In a trailer hitching system comprising a hitch bar carrying a hitching ball connected to an extended length neck, a collar below said hitching ball surrounding said neck and reciprocable on said neck, said collar having a plurality of electrical conductors, a plurality of electrical contacts on said collar, each electrical contact having one of said electrical conductors connected thereto, said hitch bar including a proximal coupling half with a rectangular cross-section receivable within a rectangular cross-section recess in a coupling receptacle on a towing vehicle to couple said hitch bar to said towing vehicle, a socket on a towed vehicle sized to couple with said hitching ball and including electrical circuitry connectable to said electrical contacts on said collar to electrically connect electrical systems on said towed vehicle to said electrical contacts on said collar, the improvement comprising a passageway extending through said proximal coupling half, said electrical conductors for said electrical contacts on said collar extending through said passageway to a proximal end of said proximal coupling half, a first electrical connector half located on said proximal end of said proximal coupling half, each of said electrical conductors being connected to an electrical contact on said first electrical connector half, and a second electrical connector half located in said coupling receptacle, said second electrical connector half having electrical contacts thereon complementary to said contacts on said first electrical connector half and aligned therewith, whereby said electrical connector halves engage one another to electrically connect said electrical contacts on said collar with said electrical contacts on said second electrical connector half, said electrical contacts on said second electrical connector half being electrically connected to electrical circuitry on said towing vehicle, said coupling receptacle and proximal coupling half having lateral holes alignable to facilitate inserting a pin therethrough to couple said coupling receptacle to said proximal coupling half, the improvement further comprising said hitching ball and extended length neck comprising a ball assembly also including a threaded shaft, said ball assembly made of a material exhibiting a tensile strength of at least 95,000 psi.

9. The improvement of claim 8, wherein said material comprises 4140 carbon steel.

10. The improvement of claim 8, wherein said material comprises 4142 carbon steel.

11. The improvement of claim 8, wherein said material has a tensile strength of 95,000 psi to 140,000 psi.

12. In a ball assembly for a trailer hitch including a ball connected to an extended length neck connected to an elongated shaft, the improvement comprising fabricating said ball assembly out of a steel material with a tensile strength of at least 95,000 psi.

13. The improvement of claim 12, wherein said tensile strength is in the range of 95,000 psi to 140,000 psi.

14. The improvement of claim 12, wherein said extended length neck has a cylindrical portion.

15. The improvement of claim 14, wherein said cylindrical portion is 1" long.

16. The improvement of claim 15, wherein said cylindrical portion has a diameter of 1.125".

17. The improvement of claim 15, wherein said cylindrical portion has a diameter of 1.25".

18. The improvement of claim 12, wherein said steel material comprises 4140 carbon steel.

19. The improvement of claim 12, wherein said steel material comprises 4142 carbon steel.

20. The improvement of claim 12, wherein said extended length neck includes an area with flats to receive a wrench. 1.25".

\* \* \* \* \*